(12) United States Patent
Dumitrescu et al.

(10) Patent No.: US 11,985,054 B1
(45) Date of Patent: May 14, 2024

(54) NETWORK LEVEL SYNCHRONIZATION OF LOW LATENCY PACKET TRANSMISSION

(71) Applicant: Canoga Perkins Corporation, Chatsworth, CA (US)

(72) Inventors: Razvan Tudor Dumitrescu, Ottawa (CA); Brett Michael Bergquist, Watertown, CT (US); David Alan Untrauer, Los Angeles, CA (US); Lucas Koy Lawrence, Castiac, CA (US)

(*) Notice: Subject to any disclaimer, the term of this patent is extended or adjusted under 35 U.S.C. 154(b) by 0 days.

(21) Appl. No.: 18/226,868

(22) Filed: Jul. 27, 2023

Related U.S. Application Data (60) Provisional application No. 63/394,079, filed on Aug. 1, 2022.

(51) Int. Cl.
*H04L 45/02* (2022.01)
*H04L 41/22* (2022.01)
*H04L 45/121* (2022.01)

(52) U.S. Cl.
CPC .............. *H04L 45/02* (2013.01); *H04L 41/22* (2013.01); *H04L 45/121* (2013.01)

(58) Field of Classification Search
CPC ........ H04L 45/02; H04L 41/22; H04L 45/121
See application file for complete search history.

(56) References Cited

U.S. PATENT DOCUMENTS

2020/0210358 A1* 7/2020 ChoFleming ......... H04L 49/356
2020/0396150 A1* 12/2020 Dillon ................... H04L 45/121

\* cited by examiner

*Primary Examiner* — Joe Chacko
(74) *Attorney, Agent, or Firm* — Philip O. Post; Robert J. Everling (57) ABSTRACT

Method and system for network level synchronization of low latency packet transmission in a packet transmission network, to minimize end-to-end latency of packets in the network.

16 Claims, 8 Drawing Sheets

NETWORK LEVEL SYNCHRONIZATION OF LOW LATENCY PACKET TRANSMISSION

CROSS-REFERENCE TO RELATED APPLICATIONS

This application claims priority to U.S. Provisional Application No. 63/394,079 filed Aug. 1, 2022, hereby incorporated by reference in its entirety.

FIELD OF THE INVENTION

The present invention is related to synchronizing transmission of packets across multiple devices in a packet transmission network.

BACKGROUND OF THE INVENTION

Packet switching networks, such as Ethernet or IP networks, are inherently an asynchronous transport technology. Individual devices in the network (i.e. network switches or routers) are not synchronized with each other, and each device makes independent decisions about packet transmission. However, in order to guarantee the ultra-low latency requirements for modern networks, transmission synchronization mechanisms must be implemented, such that the overall queueing time for packets transiting the network is minimized.

A typical packet switching network consists of: (a) a collection of interconnected network devices (network switches or routers), each device with two or more ports, (b) a unified, network level, set of forwarding rules which allows a packet to traverse the network from a specific source (ingress switch) to a specific destination (egress switch), and (c) a network management system (or network controller), which manages individual network devices and has an aggregated, network level view of the overall network configuration and performance.

The end-to-end network level latency in a network is defined herein as the time elapsed from the reception of the first bit of a packet at the ingress port of the first device (ingress switch) in the network until the transmission of the last bit of the same packet at the egress port of the last device (egress switch) in the network.

The end-to-end latency contains multiple components, as identified in FIG. 1 and itemized below.

Component (1): time spent to fully receive a packet in the first switch in the network, which can be determined from the packet size and the speed of the ingress interface.

Component (2): time spent to process the packet and decide where the packet should be forwarded, which time depends on implementation and specific hardware characteristics of a given switch (device), and is the same for all packets.

Component (3): time spent by the packet waiting in a queue to be sent out.

Component (4): time spent to transmit the packet out of the switch. This can be determined based on the packet size and the speed of the egress interface.

Component (5): time spent between switches in the network. Component (5) time depends on the length of the connection between switches and can be measured empirically by using methods known in the art, such as the protocol described in ITU-T Y. 1731 DMM.

The mechanism for network level synchronization of low latency packet transmission disclosed herein focuses on minimizing the total time spent by the packet waiting in the queues to be sent out—component (3) in the list above.

Queue Delays and Scheduling Mechanisms

Queue delay represents the time a packet spends in the egress queue of a particular switch; this time varies dynamically with each packet and depends on the number and size of other packets waiting in the egress queues. A typical network switch has multiple egress queues for each port, with each egress queue having different scheduling times and priorities. For example, a scheduling rule (i.e. strict priority rule) may specify that all packets in egress queue A must be transmitted before any packet from egress queue B.

A common scheduling mechanism in modern networks is a time based transmission, or Weighted Round Robin (WRR). In WRR, each queue is given an allocated amount of time (designated a time slice) to transmit packets associated with the queue. After the allocated time for a queue ends, a different queue (or a set of queues) is given time to transmit its packets. Multiple queues can be open for transmission at the same time.

Figure 2A:
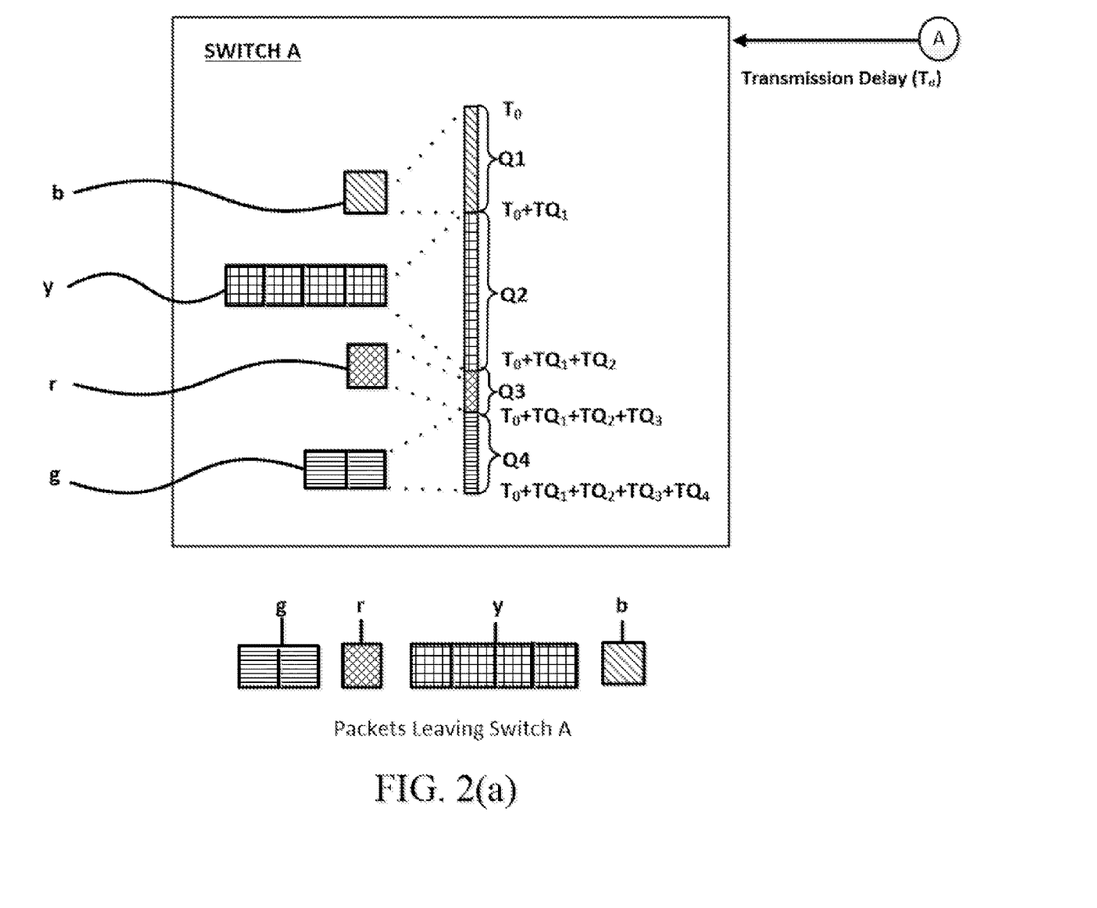
FIG. 2(a) and FIG. 2(b) illustrate one example of the behaviour of a set of packets traversing two switches, with unsynchronized packet transmission.
Figure 2B:
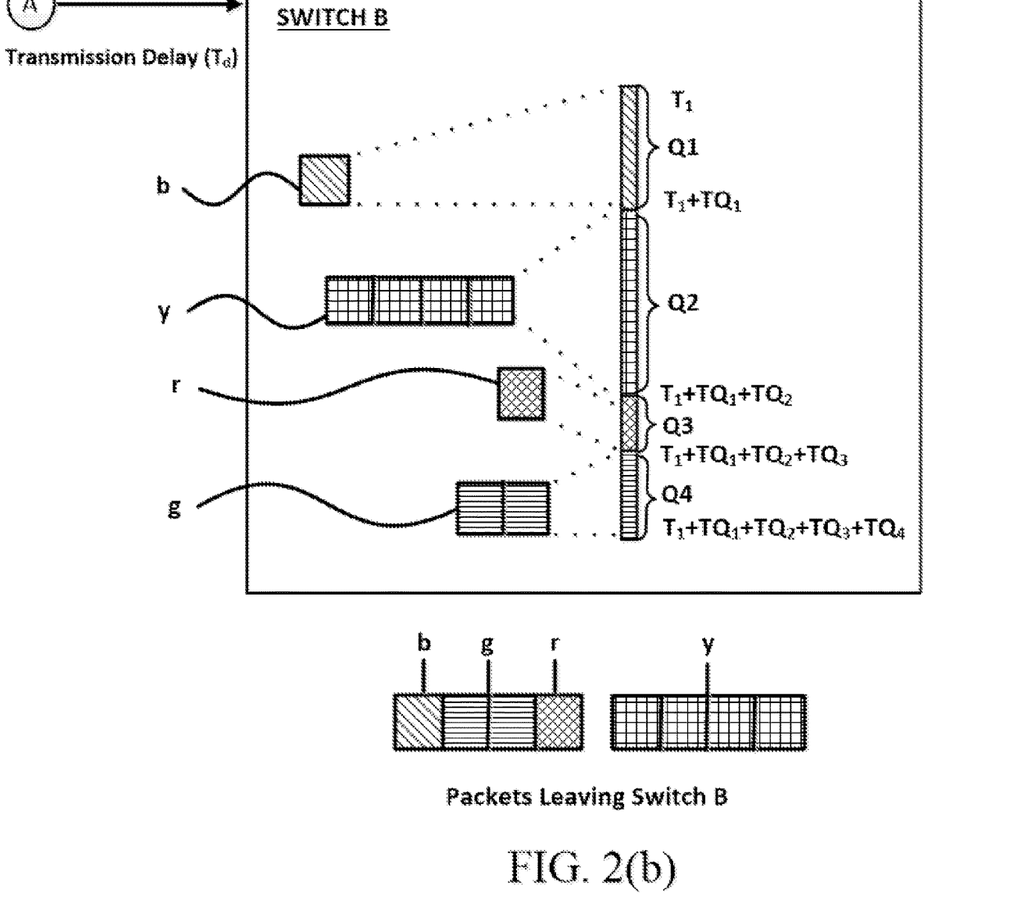

FIG. 2(a) and FIG. 2(b) illustrate an example of the behaviour of a set of packets traversing two switches in a network, namely Switch A and Switch B. In this example the switches implement four queues, with WRR scheduling, such that queue Q1 is open for time $TQ_1$, queue Q2 is open for time $TQ_2$, followed by queue Q3 being open for time $TQ_3$, and queue Q4 being opened for time $TQ_4$. After this four-queue scheduling cycle completes, the queue cycle Q1, Q2, Q3 and Q4 repeats starting with queue Q1 being open again for $TQ_1$. In this example there is a packet in each queue at time $T_0$. The packets will leave Switch A in this order (based on departure time, first bit out):

Packet "b" queued in Q1 departs at $T_0$
Packet "y" queued in Q2 departs at $T_0+TQ_1$
Packet "r" queued in Q3 departs at $T_0+TQ_1+TQ_2$
Packet "g" queued in Q4 departs at $T_0+TQ_1+TQ_2+TQ_3$ Each packet will spend the same amount of time ($T_d$) on the wire (or other transmission medium) between Switch A and Switch B. Hence packet "b" will arrive at Switch B at $T_0+T_d$. In the classical Ethernet network, where the transmission between switches is not synchronized, the queue for packets "b" might be closed at Switch B when packet "b" from Switch A arrives. In the worst case, packet "b", which arrived first at Switch A might need to wait for $(TQ_2+TQ_3+TQ_4)$ time period before leaving Switch B, and after all other packets have left. Synchronization of packet transmission will allow queue Q1 (the queue for packets "b") in Switch B to be opened for transmission when the packet "b" from Switch A arrives.

One object of the present invention, in a generalized network, is a system and method to synchronize transmission time for different queues and traffic flows, between multiple switches in the network, with the aim of minimizing the total queue delays.

BRIEF SUMMARY OF THE INVENTION

The present invention discloses a system and method for synchronizing the transmission of packets between different devices (network switches) in a packet transmission network. As a result of transmission synchronization, the end-to-end latency of packets in the packet transmission network is minimized. The mechanism is based on a series of steps and interactions between individual devices in the packet transmission network, as well as the devices and a network management system (network controller).

Figure 3:
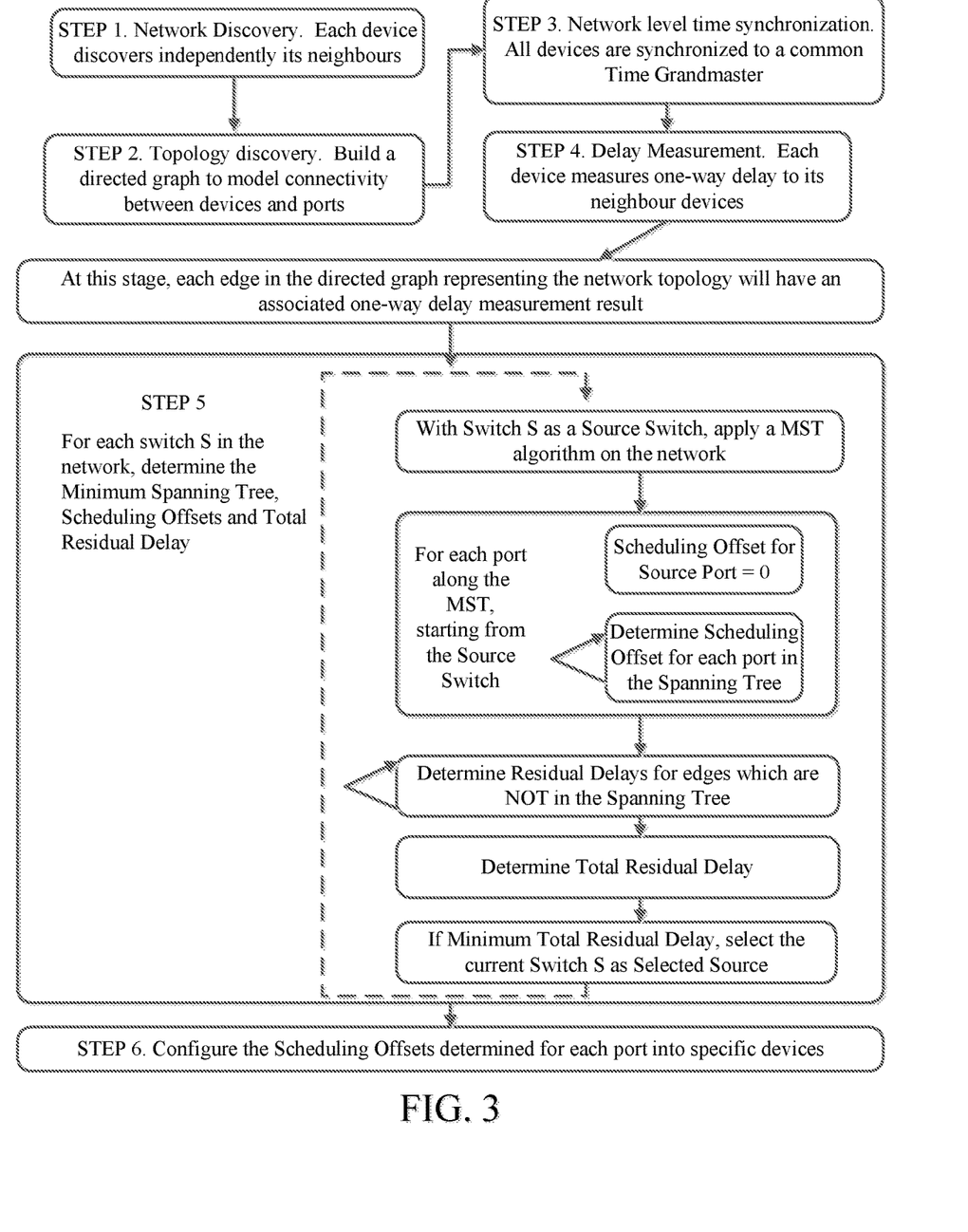
FIG. 3 is a diagram representative of one embodiment of the present invention.

With reference to FIG. 3, initially each individual device in the packet transmission network, such as each interconnected network switch, discovers each directly connected peer (neighbour devices). Once each switch has discovered and identified their neighbour switches, transmission delays between the neighbour switches are measured, and reported by each device to the network controller. To ensure effective packet transmission synchronization, the transmission delay must be measured with sufficient accuracy, for example, limiting uncertainty in the measurement to one nanosecond or lower. The network controller then uses the information collected from each individual device to model the network, as a graph, for use in subsequent steps.

The network controller determines, using the detailed steps described in this disclosure, a set of Minimum Spanning Trees for the network, then, for each Minimum Spanning Tree, determines a Scheduling Offset for each port in the Minimum Spanning Tree and a Residual Delay for each edge that is not part of the Minimum Spanning Tree, and then selects a Scheduling Source Switch among the devices in the network such that the Total Residual Delay, determined according to this disclosure, is the lowest possible value.

For any packet transmission network, one or more Minimum Spanning Trees can be algorithmically built. A Minimum Spanning Tree creates a set of paths in the network, from one source device (Source Switch) to all other devices in the network, such that there is no loop on those paths, and the paths have the lowest possible cost. A path consists of vertices (ports) and edges (links between ports). An edge has a specific cost, which is application specific; in the present invention, the cost of an edge is determined based on the measured transmission delay on that specific link. There are multiple algorithms to build a Minimum Spanning Tree known in the art.

For a given port included in the Minimum Spanning Tree of the network, a Scheduling Offset represents the amount of time (the offset) from a known time synchronization event (such as the occurrence of a pulse-per-second signal (1PPS), or the boundary of 1 second), when the queue scheduling sequence will start. For example, a Scheduling Offset of 50 microseconds means that the queue scheduling sequence, such as WRR time allocations, start at 50 microseconds after the known time synchronization event.

The Residual Delay is determined for edges that are not part of the Minimum Spanning Tree, and models the amount of delay that a packet must spend when it takes an edge (a connection between two ports) which is not the part of the Minimum Spanning Tree.

As a last step, the network controller assigns the determined Scheduling Offsets in all switches in the network. Switches will adjust their queue scheduling sequence based on the specified Scheduling Offsets. As a result of switches having synchronized Scheduling Offsets, the time spent by a packet in a switch waiting to be transmitted is minimized.

The above and other aspects of the present invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

Methodology for Synchronization

In this example of the invention there is a generic network of N switches; with each switch having two or more ports, and the number of ports can be different among the switches in the network. The switches are connected in a generic (mesh) topology. In this example, all ports have the same number of queues (K), but the invention applies as well for networks with different number of queues per port.

The number of queues that are applicable for each deployment, the classification of packets to different queues, as well as the appropriate transmission window (designated time slice) for each queue $t(Q_i)$ is application specific, and it can be determined through methods known in the art. For example, simple applications may require only two queues per port (high priority or low priority), while complex, large scale applications may require tens of queues.

Each switch must have a hardware level time register, or a similar means to know the time, with sufficient accuracy. The time accuracy is determined by the specific application, but in any case, should be less than the time it takes to send a 64 byte packet (the shortest packet allowed by the Ethernet technology) on the fastest port in the network. For example, if the fastest port in the network is 100 Gbps, then the accuracy of hardware time register must be 5 nanoseconds or better.

The invention described below can be executed by a single computer software which has access to all the switches in the network (centralized network controller) or, with software running independently on each switch, but exchanging necessary information with all other switches in the network (distributed network controller).

In the first step of the system and method of the present invention, all switches in the network discover their neighbours, (defined as directly connected switches). Protocols and mechanisms for neighbour discovery known in the art, such as LLDP (Link Layer Discovery Protocol) defined in IEEE 802.1AB-2017 standard, Service OAM, defined in ITU-T Y. 1731 (2015) standard, or IPv6 Neighbour Discovery Protocol, defined in IETF RFC 4861 with subsequent updates that can be applied by one skilled in the art.

In the second step, the collected information about neighbours is used to build a complete topology of the network. The most common representation of a network topology is a graph, where each port is a vertex and each connection between two ports is an edge. This representation must also include connections between ports within the same device.

In the third step, all switches in the network are time synchronized. There are methodologies and protocols known in the art, such as PTPv2 protocol (IEEE 1588-2019), or PTP and SyncE (ITU-T G. 8273.1), which allow for all devices in the network to be synchronized to a common Time Grandmaster. At the end of this step, the time registers across all switches in the network will be the same, within an acceptable error defined by the protocol used. A consequence of this synchronization is that the start of each one second interval, relative to the common Time Grandmaster, is the same across all switches in the network.

In the fourth step, each switch measures the one-way transmission delay to all its neighbouring switches. Once the time is synchronized across the switches, one-way transmission delay can be measured with protocols known in the industry, such as ITU-T Y. 1731 SOAM 1DM procedures. As a result of this step, each directed edge in the network topology graph established in the second step will have an associated one-way transmission delay result.

In the fifth step, each switch is sequentially selected as a Source Switch and a Minimum Spanning Tree is built for using the selected Source Switch. Alternatively, the following procedure may be performed only on a subset of the switches in the network, chosen based on specific application requirements. For each Source Switch, various synchronization offsets are determined and tabulated to ultimately identify the Source Switch representing the most efficient synchronization paradigm at the network level.

A Minimum Spanning Tree (MST) algorithm known in the art (e.g. Djikstra or Prim, algorithm) is applied to find a Minimum Spanning Tree from the Source Switch to all other switches in the system. The measured one-way transmission delay is used as a cost for each edge. For internal edges, the internal processing latency for each switch is used as a cost for each internal edge.

Starting from the Source Switch, a Scheduling Offset for ports in each switch in the network, is determined as follows:

The Scheduling Offset for all ports in the Source Switch is 0.

For the ports in the first hop switches in the Minimum Spanning Tree after the Source Switch (switches directly connected to the Source Switch), the Scheduling Offset is the one-way transmission delay from the Source Switch, plus, where applicable, the cost of the internal edge in the first hop switches that is in the Minimum Spanning Tree.

Generally, the following is performed:

$$\text{Scheduling Offset(Port } X) = \sum_{\text{edges from Source Switch to port } X} \text{Edge cost} \% \sum_{i=0}^{K} t(Q_i)$$

That is, the Scheduling Offset for a particular port on the Minimum Spanning Tree is the sum of edge costs from the Source Switch to that particular port (which is equal to the time it takes for a packet leaving the Source Switch to reach that particular port), normalized (modulo) to the sum of time allocations for each queue.

In the next step, for each external edge which is not part of the Minimum Spanning Tree, for example the external edge between Port X and Port Y, the following calculation is made:

Residual Delay($X,Y$)=|Scheduling Offset(Port $X$)−Scheduling Offset(Port $Y$)| and we add together all residual delays:

$$\text{Total Residual Delay} = \sum_{X,Y \text{ edge is not part of the Minimum Spanning Tree}} \text{Residual Delay}(X, Y)$$

Finally, if the determined Total Residual Delay, for this current Source Switch, is lower than any previously determined Total Residual Delay, the current Source Switch is marked as the Selected Source Switch. The network controller tabulates the Scheduling Offsets determined for each port and stores the tabulated information in a non-transitory computer readable memory of the network controller.

At the end of the fifth step, the Selected Source Switch and the associated Scheduling Offsets contain the configuration which produces the lowest Total Residual Delay.

In the sixth step, the Scheduling Offsets selected for each port according to the result of the fifth step are configured in each switch. The Scheduling Offset value of each port represents the starting point of the queue scheduling sequence, as an offset to a synchronized time boundary, such as the start of a 1 second interval. As previously disclosed, as a result of third step, the start of a second interval is the same across all devices in the network.

As a result of the sixth step, the transmission windows for queues in the switches are synchronized; when each packet arrives from a previous switch, it is likely to find the queue in the current switch open for transmission. If the queue is not open for transmission when each packet arrives, such as a result of residual delays, then in aggregate, the amount of time spent by each packet waiting for the queue to open is minimized.

As an example for this invention, FIG. 4(*d*) describes the result of this invention for two different ports in the network depicted in FIG. 4(*a*): Port 4 of Switch 1 and Port 1 of Switch 5. 1 PPS signals between the switches are synchronized in the third step. One-way transmission delays ($T_d$) are measured in the fourth step and they are used as costs for external edges in the fifth step. Processing latency is used as cost for internal edges in the fifth step. In the fifth step, Switch 1 is selected as the Selected Source Switch, hence all the Scheduling Offsets for all port in Switch 1 are 0. The Scheduling Offset for Port 1 of Switch 5, is determined as 3.5 milliseconds, and programmed in the sixth step in Switch 5.

FIG. 4(*a*) through FIG. 4(*d*) illustrate one graphic representation of network level synchronization of low latency packet transmission of the present invention. In some embodiments of the invention, a graphic display system is provided in the network controller system for display of the graphic representations shown in the figures.

FIG. 4(*a*) displays the connected physical network topology including network switches and the connections between the network switches (shown in continuous lines) and internal switch connections where optionally used (as shown in dashed lines). Within a switch, it is not necessary to have connections between all ports; switching policies and rules may limit the possible egress ports for a given ingress port.

FIG. 4(*b*) displays the physical network in FIG. 4(*a*) as a directed graph representation. In this display internal directed edges are shown in solid lines and external directed edges are shown in dashed lines. The cost for each edge is derived by the network controller according to the fourth process step as disclosed above. All edges have a cost; however, FIG. 4(b) only indicates cost values for representative edges to maintain clarity of the directed graph in FIG. 4(b). Namely, representative external edge costs are: 480 (S1,P4)-(S3,P4); 500 (S3,P4)-(S1,P4); 1500 (S3,P2)-(S5,P3); 1450 (S5,P3)-(S3,P2); 204 (S4,P4)-(S5,P1); and 200 (S5,P1)-(S4,P4) with all cost values in nanoseconds. Representative internal edge costs are: 3 (S4,P2)-(S4,P3); 9 (S4,P4)-(S4,P2); 2 (S2,P1)-S2,P4); and 11 (S2,P4)-(S2,P1) with all cost values in nanoseconds.

Figure 4A:
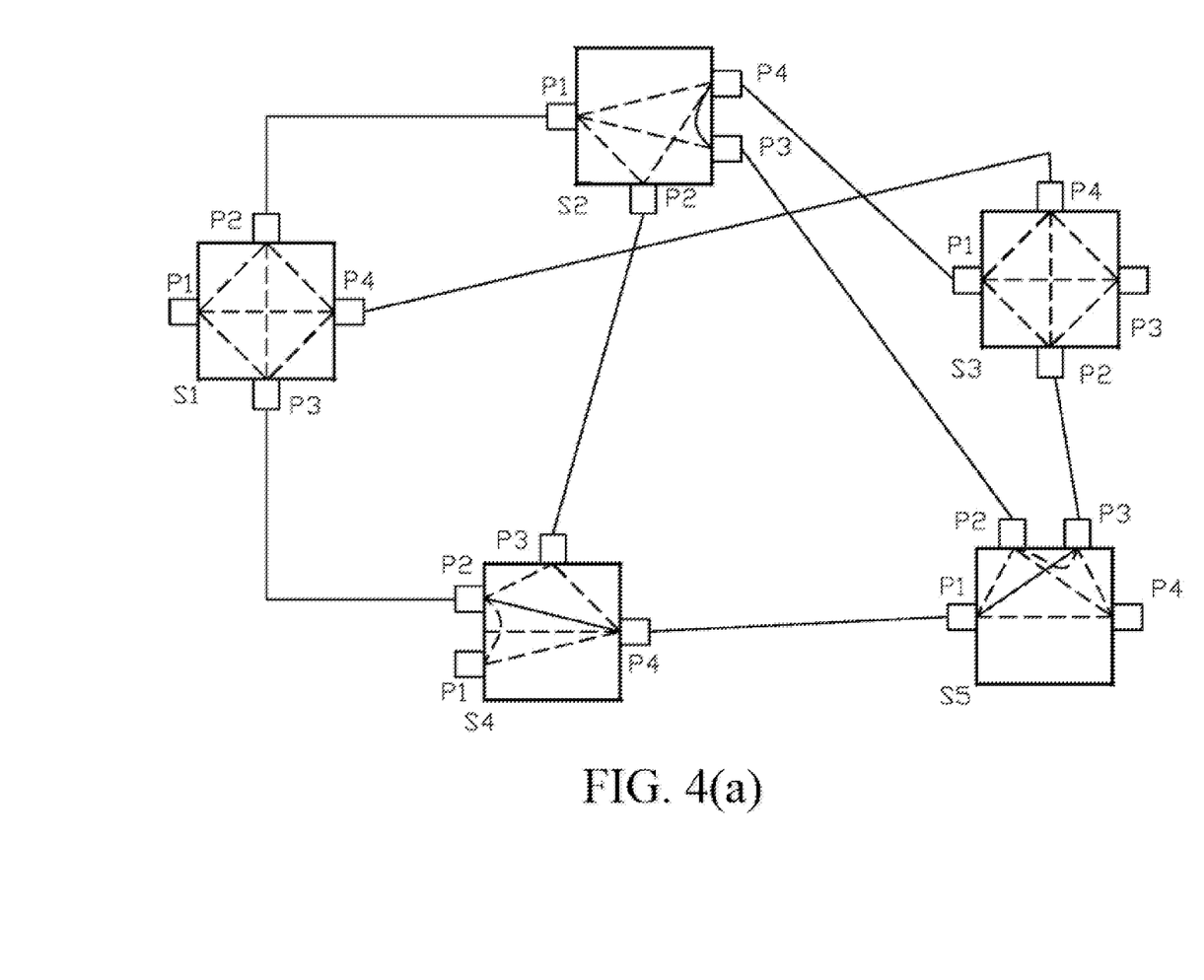
FIG. 4(a) through FIG. 4(d) illustrate one graphic representation of network level synchronization of low latency packet transmission of the present invention.
Figure 4B:
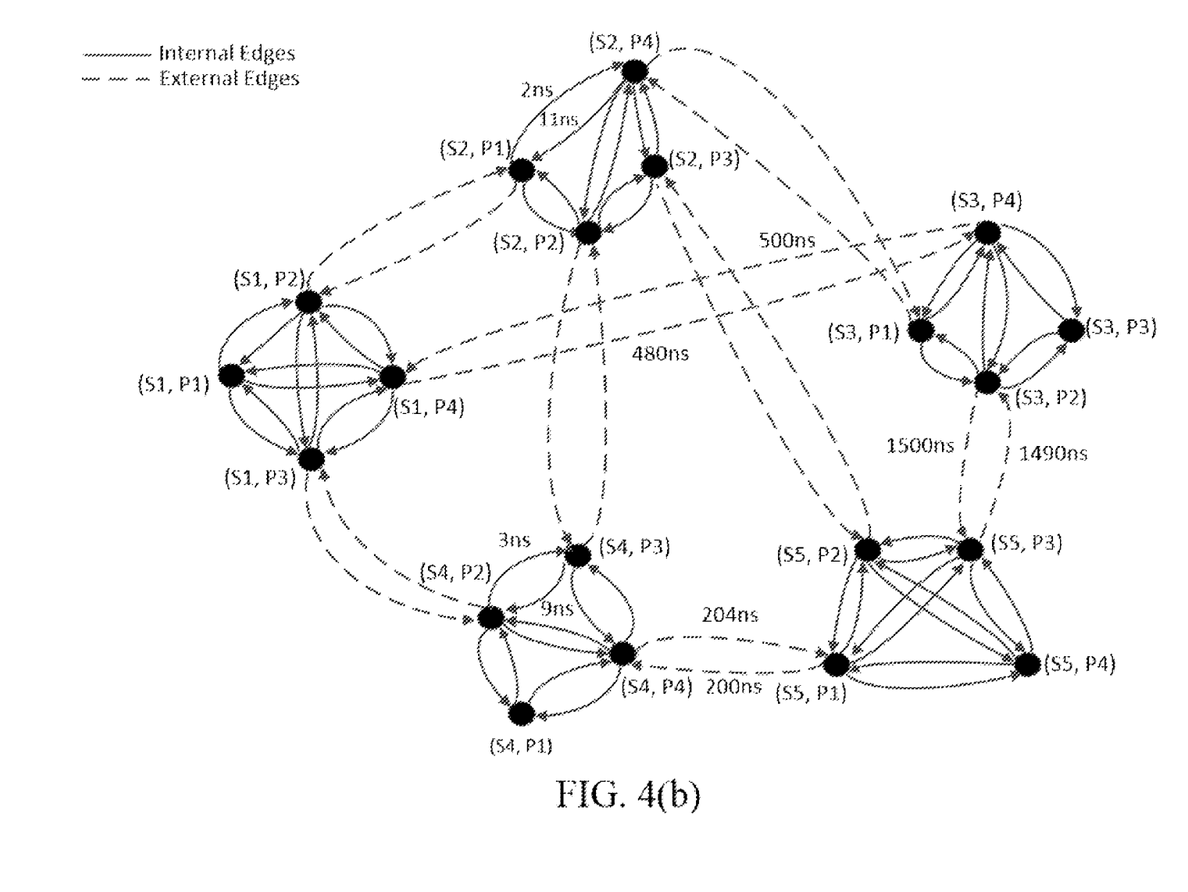
Figure 4C:
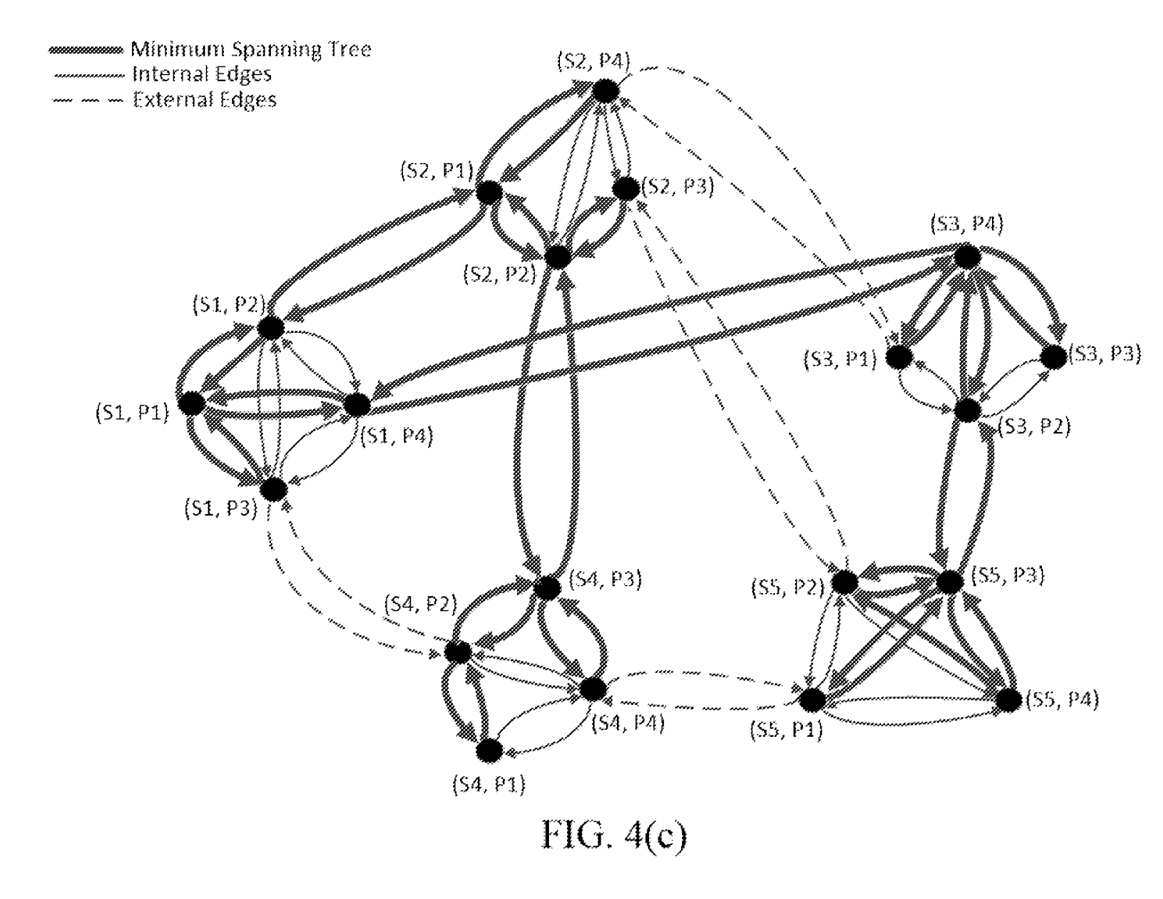

FIG. 4(c) displays a Minimum Spanning Tree (in a thick continuous line) for the physical network shown FIG. 4(a) (represented as a directed graph in FIG. 4(b)), with switch S1 selected as the Source Switch. Refer to FIG. 4(b) for internal and external edges in the Minimum Spanning Tree. The Minimum Spanning Tree is derived by the network controller according to the fifth process step as disclosed above. In the fifth step, Residual Delays are determined for the network edges that are not part of the Minimum Spanning Tree.

Figure 1:
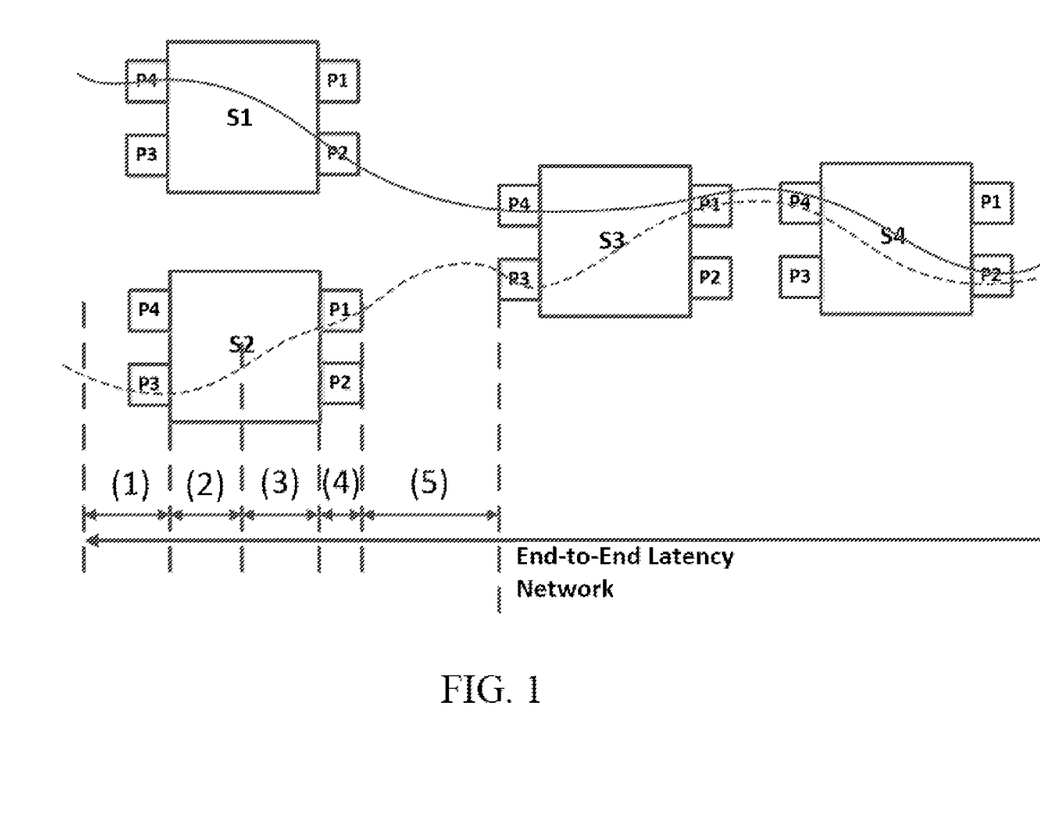
FIG. 1 illustrates multiple time components associated with end-to-end latency in a packet transmission network from network ingress to network egress.
Figure 4D:
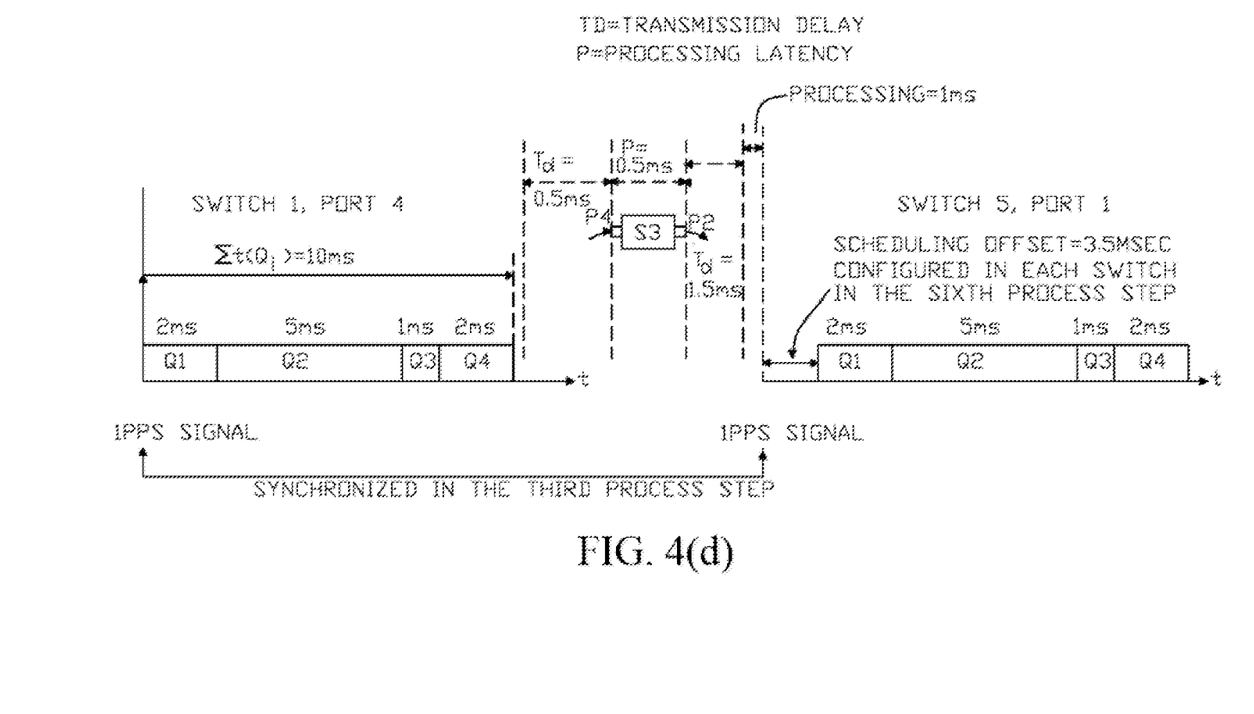

FIG. 4(d) displays the transmission windows for Switch 1, Port 4 and Switch 5, Port 1 in the network shown in FIG. 1, after all steps disclosed above have been completed. In this example of the invention a derived Scheduling Offset of 3.5 milliseconds that applies to the queue scheduling cycle on Switch 5, Port 1. The Scheduling Offset is equal to the total delay encountered by a packet from the moment it leaves Port 4 of Switch 1, to the moment of arrival at Port 3 of Switch 5 (not shown in FIG. 4 (d)), plus the internal processing latency within Switch 5 (between Port 3 of Switch 5 and Port 1 of Switch 5). In the illustrated embodiment, the Scheduling Offset comprises the transmission delay between Port 4 of Switch 1 and Port 4 of Switch 3 plus the internal processing latency of Switch 3 plus the transmission delay between Port 2 of Switch 3 and Port 3 of Switch 5.

Further Variants of the Invention

The invention disclosed above considers each edge in the network topology with equal priorities. However, alternate embodiments of the present invention can further apply differing priorities to one or more edges within the packet transmission network, such that delays across edges with higher priorities are minimized at the expense of increasing delays across edges with lower priorities. Alternatively, specified edges may be selected as restricted preventing some or all packet transmission across such restricted edges. In some such embodiments, specific packets may be identified as permitted for transmission across restricted edges.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A method for network level synchronization of low latency packet transmissions, the network governed by a network controller and having a plurality of interconnected switches, each switch having one or more ingress ports and one or more egress ports, the method comprising:

(a) discovering for each switch of the plurality of interconnected switches one or more directly connected switches, wherein the one or more directly connected switches are operably connected together with no intervening switches;

(b) generating a directed network topology graph having a plurality of vertices representative of each ingress port and each egress port of each switch, one or more directed external edges defined between vertices of the plurality of vertices, the one or more directed external edges representative of external connections between egress ports and ingress ports of directly connected switches, and one or more directed internal edges defined between vertices of the plurality of vertices, the one or more directed internal edges representative of internal connections between ingress ports and egress ports of the same switch of the plurality of interconnected switches;

(c) synchronizing a time register of each switch of the plurality of interconnected switches to a common time grandmaster, such that a start of each one second interval is the same across all switches of the plurality of interconnected switches within an acceptable error threshold;

(d) measuring for each switch a transmission delay to each directly connected switch;

(e) assigning the transmission delay as a cost of the associated directed external edge in the directed network topology graph;

(f) measuring an internal processing latency for each switch of the plurality of interconnected switches;

(g) assigning the internal processing latency for each switch as a cost of the associated directed internal edges in the directed network topology graph;

(h) identifying one switch of the plurality of interconnected switches as a source switch;

(i) generating a minimum spanning tree from the source switch to each remaining switch of the plurality of interconnected switches;

(j) defining a scheduling offset of each egress port and ingress port of the source switch as zero;

(k) determining a total scheduling offset for each egress port and ingress port within the minimum spanning tree, the total scheduling offset defined as a sum of the cost of each directed internal edge and each directed external edge within the minimum spanning tree, between the source switch and the associated port;

(l) determining a normalized scheduling offset for each egress port and ingress port other than the ports of the source switch, the normalized scheduling offset defined as the total scheduling offset normalized modulo to a sum of a plurality of transmit window times associated with each egress port and ingress port;

(m) storing the determined normalized scheduling offsets related to the source switch in a non-transitory computer readable memory of the network controller;

(n) determining a residual delay for each directed internal edge and each directed external edge not located within the minimum spanning tree, the residual delay defined as an absolute value of a difference between the normalized scheduling offsets of the ports associated with the edge;

(o) determining a total residual delay as a sum of each determined residual delay;

(p) repeating steps (h) through (o) replacing the source switch in step (h) with a different switch of the plurality of interconnected switches until each switch has been designated the source switch once;

(q) selecting the source switch producing the lowest total residual delay;

(r) configuring each port to incorporate the normalized scheduling offset value determined for the selected source switch in step (l) such that each port starts a per queue packet transmission schedule cycle using the associated normalized scheduling offset as a delay from a common synchronized time event, such as the start of the one second interval.

2. The method of claim 1, further comprising assigning a priority status to one or more of the directed internal edges and directed external edges, whereupon the source switch producing the lowest total residual delay across the one or more directed internal edges and directed external edges having priority status is selected.

3. The method of claim 1, further comprising assigning a restricted status to one or more of the directed internal edges and directed external edges, such that packet transmission across the one or more directed internal edges and directed external edges having restricted status is prevented.

4. The method of claim 3, further comprising assigning permitted status to one or more packets traversing the network, wherein packets having permitted status may be transmitted across directed internal edges and directed external edges having restricted status.

5. The method of claim 1, further comprising displaying the directed network topology graph on a graphic display system of the network controller.

6. A method for selecting a network level synchronization and offset paradigm for low latency packet transmissions in a time-synchronized packet transmission network, the network governed by a network controller and having a plurality of interconnected switches, each switch having one or more ingress ports and one or more egress ports, the network further modeled with a directed network topology graph having one or more directed external edges defined between egress ports and ingress ports of directly connected switches of the plurality of interconnected switches, and one or more directed internal edges defined between ingress ports and egress ports of the same switch of the plurality of interconnected switches, the method comprising:
  (a) identifying one switch of the plurality of interconnected switches as a source switch;
  (b) generating a minimum spanning tree from the source switch to each remaining switch of the plurality of interconnected switches, wherein a cost of the directed internal edges is a processing delay of the associated switch and a cost of the directed external edges is a transmission delay across an associated connection between directly connected switches;
  (c) defining a scheduling offset of each egress port and ingress port of the source switch as zero;
  (d) determining a total scheduling offset for each egress port and ingress port within the minimum spanning tree, the total scheduling offset defined as a sum of the cost of each directed internal edge and each directed external edge within the minimum spanning tree, between the source switch and the associated port;
  (e) determining a normalized scheduling offset for each egress port and ingress port other than the ports of the source switch, the normalized scheduling offset defined as the total scheduling offset normalized modulo to a sum of a plurality of transmit window times associated with each egress port and ingress port;
  (f) storing the determined normalized scheduling offsets related to the source switch in a non-transitory computer readable memory of the network controller;
  (g) determining a residual delay for each directed internal edge and each directed external edge not located within the minimum spanning tree, the residual delay defined as an absolute value of a difference between the normalized scheduling offsets of the ports associated with the edge;
  (h) determining a total residual delay as a sum of each determined residual delay;
  (i) repeating steps (a) through (h) replacing the source switch in step (a) with a different switch of the plurality of interconnected switches until each switch has been designated the source switch once;
  (j) selecting the source switch producing the lowest total residual delay;
  (k) configuring each port to incorporate the normalized scheduling offset value determined for the selected source switch in step (e) such that each port starts a per queue packet transmission schedule cycle using the associated normalized scheduling offset as a delay from a common synchronized time event, such as the start of the one second interval.

7. The method of claim 6, further comprising assigning a priority status to one or more of the directed internal edges and directed external edges, whereupon the source switch producing the lowest total residual delay across the one or more directed internal edges and directed external edges having priority status is selected.

8. The method of claim 6, further comprising assigning a restricted status to one or more of the directed internal edges and directed external edges, such that packet transmission across the one or more directed internal edges and directed external edges having restricted status is prevented.

9. The method of claim 8, further comprising assigning permitted status to one or more packets traversing the network, wherein packets having permitted status may be transmitted across directed internal edges and directed external edges having restricted status.

10. The method of claim 6, further comprising displaying the directed network topology graph on a graphic display system of the network controller.

11. A synchronized low latency packet transmission network, comprising:
  a plurality of interconnected switches, each switch of the plurality of interconnected switches having one or more ingress ports and one or more egress ports;
  a network controller in communication with the plurality of interconnected switches, wherein the network controller synchronizes each switch to reduce latency in packet transmission by performing the steps:
    (a) discovering for each switch of the plurality of interconnected switches one or more directly connected switches, wherein the one or more directly connected switches are operably connected together with no intervening switches;
    (b) generating a directed network topology graph having a plurality of vertices representative of each ingress port and each egress port of each switch, one or more directed external edges defined between vertices of the plurality of vertices, the one or more directed external edges representative of external connections between egress ports and ingress ports of directly connected switches, and one or more directed internal edges defined between vertices of the plurality of vertices, the one or more directed internal edges representative of internal connections between ingress ports and egress ports of the same switch of the plurality of interconnected switches;
    (c) synchronizing a time register of each switch of the plurality of interconnected switches to a common time grandmaster, such that a start of each one second interval is the same across all switches of the plurality of interconnected switches within an acceptable error threshold;

(d) measuring for each switch a transmission delay to each directly connected switch;

(e) assigning the transmission delay as a cost of the associated directed external edge in the directed network topology graph;

(f) measuring an internal processing latency for each switch of the plurality of interconnected switches;

(g) assigning the internal processing latency for each switch as a cost of the associated directed internal edges in the directed network topology graph;

(h) identifying one switch of the plurality of interconnected switches as a source switch;

(i) generating a minimum spanning tree from the source switch to each remaining switch of the plurality of interconnected switches;

(j) defining a scheduling offset of each egress port and ingress port of the source switch as zero;

(k) determining a total scheduling offset for each egress port and ingress port within the minimum spanning tree, the total scheduling offset defined as a sum of the cost of each directed internal edge and each directed external edge within the minimum spanning tree, between the source switch and the associated port;

(l) determining a normalized scheduling offset for each egress port and ingress port other than the ports of the source switch, the normalized scheduling offset defined as the total scheduling offset normalized modulo to a sum of a plurality of transmit window times associated with each egress port and ingress port;

(m) storing the determined scheduling offsets related to the source switch in a non-transitory computer readable memory of the network controller;

(n) determining a residual delay for each directed internal edge and each directed external edge not located within the minimum spanning tree, the residual delay defined as an absolute value of a difference between the normalized scheduling offsets of the ports associated with the edge;

(o) determining a total residual delay as a sum of each determined residual delay;

(p) repeating steps (h) through (o) replacing the source switch in step (h) with a different switch of the plurality of interconnected switches until each switch has been designated the source switch once;

(q) selecting the source switch producing the lowest total residual delay;

(r) configuring each port to incorporate the normalized scheduling offset value determined for the selected source switch in step (l) such that each port starts a per queue packet transmission schedule cycle using the associated normalized scheduling offset as a delay from a common synchronized time event, such as the start of the one second interval.

12. The system of claim 11, further comprising the step of assigning a priority status to one or more of the directed internal edges and directed external edges, whereupon the source switch producing the lowest residual delay across the one or more directed internal edges and directed external edges having priority status is selected.

13. The system of claim 11, further comprising the step of assigning a restricted status to one or more of the directed internal edges and directed external edges, such that packet transmission across the one or more directed internal edges and directed external edges having restricted status is prevented.

14. The system of claim 13, further comprising the step of assigning permitted status to one or more packets traversing the network, wherein packets having permitted status may be transmitted across directed internal edges and directed external edges having restricted status.

15. The system of claim 11, wherein the network controller further comprises a graphic display system.

16. The system of claim 15, further comprising the step of displaying the directed network topology graph on the graphic display system of the network controller.

* * * * *